July 2, 1940.    G. TOMSIC    2,206,737
COMBINATION AUTOMOBILE WHEEL AND TIRE
Filed April 23, 1938
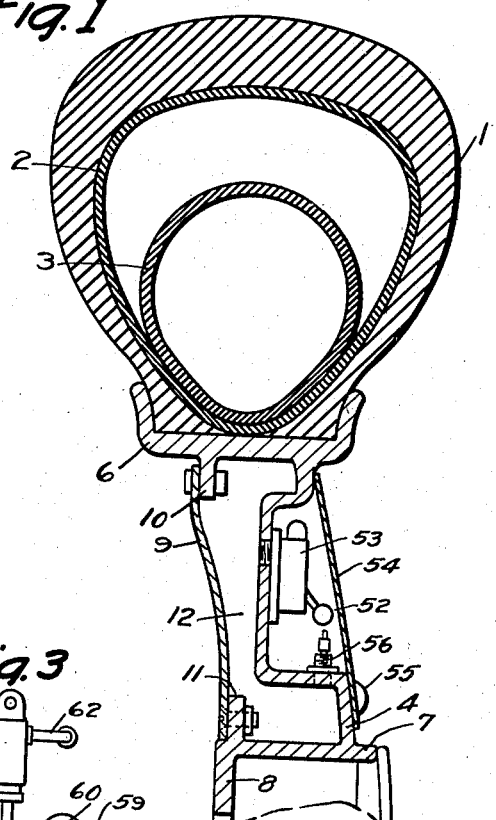
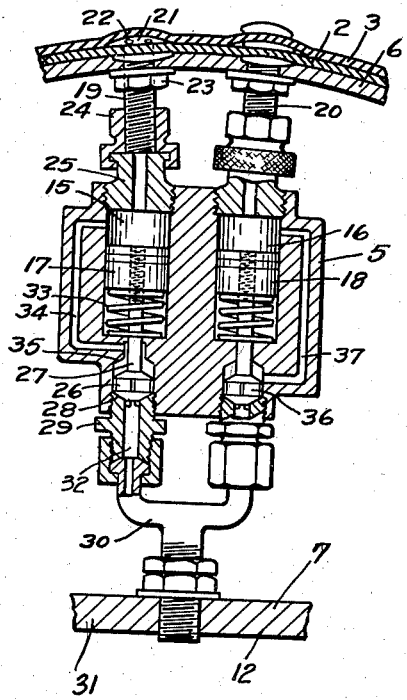
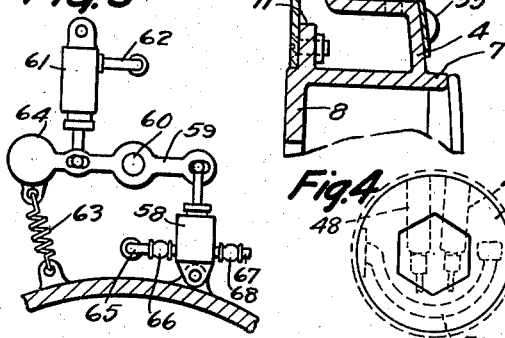
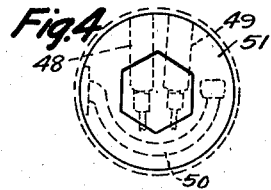
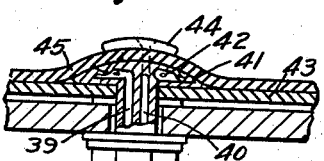
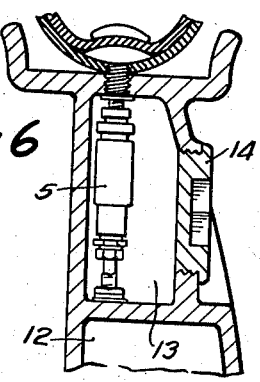
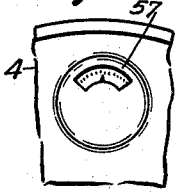
INVENTOR.
BY  *Guy Tomsic*
*James Harrison Bowen*
ATTORNEY.

Patented July 2, 1940

2,206,737

UNITED STATES PATENT OFFICE 2,206,737

COMBINATION AUTOMOBILE WHEEL AND TIRE

Guy Tomsic, New York, N. Y.

Application April 23, 1938, Serial No. 203,794

7 Claims. (Cl. 152—418)

The purpose of this invention is to provide an improvement in pneumatic tires and in wheels upon which they are mounted which makes it possible to maintain a constant pressure in the tire, and also to inflate a punctured tire automatically and while the vehicle continues in motion.

The invention is a wheel having a compressed air tank incorporated therein, and a pneumatic tire on the rim of the wheel with the usual inner tube and also with an auxiliary inner tube, with both tubes connected to the air tank through automatic valves whereby a constant pressure may be maintained in the outer tire, and also whereby the auxiliary tube may be inflated when the outer tube is punctured, said auxiliary tube positioned within the outer tube and adapted to expand to form a continuous lining for the said outer tube.

Automobile tires and inner tubes have been provided with auxiliary tubes, and wheels have been provided with air tanks, and these tanks have been connected to the tubes through automatic valves, but in order to make this combination practical it has been found necessary to use a continuous auxiliary tube inside of the normal tube, with the compressed air reservoirs in the wheels connected to and adapted to supply air to both the said tubes.

The object of this invention is, therefore, to provide an automobile tire with the usual inner tube, in which means is provided for supplying air thereto from an air reservoir in the wheel to maintain a constant pressure therein.

Another object is to provide an automobile tire with the usual inner tube, and an auxiliary inner tube inside of the former tube, with means for automatically supplying air to both of said tubes, and particularly to the inner tube when the outer tube has been punctured.

Another object is to provide means for prolonging the life of automobile tires by maintaining a constant pressure therein.

A further object is to provide means for maintaining a constant pressure in an automobile tire from a reservoir within the wheel, in which an auxiliary pump is provided for maintaining a relatively high pressure in the reservoir.

And a still further object is to provide means for maintaining a constant pressure in an automobile tire even though the tire may have been punctured which is relatively simple so that it makes it possible to provide a wheel of a simple and economical construction.

With these ends in view the invention embodies an automobile wheel of the disc type having a sealed air reservoir formed in the disc portion thereof, and an auxiliary inner tube inside of the usual inner tube in the tire, with connections having pressure operated valves therein between the tubes and reservoir, and an auxiliary pump for supplying air to the reservoir.

Other features and advantages of the invention will appear from the following description taken in connection with the drawing, wherein:

Figure 1 is a view showing a cross section of a tire with the upper part of a wheel, showing a compressed air chamber in the wheel, and also showing a small auxiliary pump incorporated therein.

Figure 2 is a detail showing the arrangement of the valves.

Figure 3 is a detail showing an auxiliary pressure control device which may be used in combination with the air reservoir.

Figure 4 is a detail showing an alternate arrangement in which each tube is provided with an independent valve, and a separate air hose is provided for supplying air from the reservoir to the tubes.

Figure 5 is a similar view showing an alternate design in which a single valve is used for the two inner tubes.

Figure 6 is a similar section showing valves incorporated in a compartment in the said air chamber.

Figure 7 is a view showing a side elevation of a portion of the wheel with a pressure gauge incorporated therein.

In the drawing the device is shown as it may be made, wherein numeral 1 indicates an outer tire or casing, numeral 2, an inner tube, numeral 3, an auxiliary inner tube, numeral 4, a wheel, and numeral 5, a valve casing.

The outer tire or shoe may be of any type or design, and may be secured to the wheel in any manner. The inner tube 2 may also be of any type, and may be provided with the usual type of valve, however, it may be preferred to combine the valve of the inner tube 2 with the valve of the auxiliary tube 3, as it is desired that these valves cooperate. It is also understood that these tubes are positioned inside of the tire 1, with the auxiliary tube 3 inside of the tube 2, and with the tire and tubes mounted upon a rim 6 which may be of any type or design, and the rim is provided at the periphery of the wheel 4 which may have a hub 7 adapted to be bolted to the hub of an axle of a motor vehicle by a flange 8, or in the usual manner.

The wheel 4 is in the form of a disc wheel with an outer continuous surface, and also with an inner continuous surface preferably formed by a plate 9 bolted or welded to flanges 10 and 11 of the wheel. It is understood, however, that the reservoir 12 in the wheel may be formed in any manner or by any means.

A compartment 13 is provided in the wheel and positioned within the reservoir 12, and a screw plug 14 is provided in the outer surface of the compartment so that the plug may be removed to provide access to the valves positioned therein.

It is understood that, although these valves are shown in detail in Figure 2, any type of automatic valve for regulating the air from the reservoir or tank 12 to the inner tubes may be used, and these valves may be located at any suitable points.

The valve 5 is formed with a body, as indicated by the numeral 5, and this is divided into two sections having cylinders 15 and 16 with pistons 17 and 18 therein, and, in the design shown, the upper end of the cylinder 15 is connected to the inner tube 2 through a screw plug 19, and the cylinder 16 is connected to the auxiliary tube 3 by a screw plug 20. The plug 19 is provided with a head 21 with openings 22 in the sides thereof, and this opens into the interior of the tube 2. This plug may be provided with a nut 23 for holding the plug in the rim 6 of the wheel. The plug 19 is connected by a coupling member 24 to a member 25 threaded in the end of the cylinder 15, and, although these connections are only illustrated with fittings, it will be understood that they may be formed in any manner to prevent leakage of air. The plug 19 and member 25, therefore, provide a passage from the interior of the inner tube 2 to the cylinder 15 so that the pressure of air in the tube will be exerted against the end of the piston 17, and this pressure is exerted upon a valve 26 through a rod 27 holding the valve against a seat 28 in a bushing 29, and the bushing is connected to the reservoir 12 through a fitting 30 which is connected to a wall 31 of the reservoir 12.

It is intended to have air under comparatively high pressure in the reservoir 12, and this air acts against the upper end of the valve 26 through the passage 32 in the bushing 29, and it will be noted that the area at the end of the valve is comparatively small as compared with the area at the end of the piston 17, so that, with the pressure in the tire considerably less than the pressure in the reservoir, the pressure in the tire will hold the valve closed, however, when this pressure drops below a certain amount, the pressure in the reservoir in combination with a spring 33 will force the valve away from the seat 28, and air may pass around the valve and through a passage 34, to the cylinder 15, and from there into the tire. Air may continue to pass through this passage until the pressure in the tire reaches a predetermined amount, and the area on the end of the piston shall be in proportion to the area at the end of the valve, so that a constant pressure may be maintained in the tire, and, as this pressure drops, it will be automatically supplemented by air from the reservoir.

When the tire is punctured so that the air therein may escape, the pressure will drop considerably, and the valve 26 will be forced against the seat 35 due to the action of the spring 33 in combination with the reduced pressure in the tire, and this will be held against the seat as long as there is pressure in the reservoir 12 so that the inner tube 2 will be closed to the reservoir. With this valve closed and, at the same time, with the pressure in the tube 2 reduced, the tube 3 may expand and the pressure therein will drop so that the air from the reservoir will then pass through the cylinder 16, filling the auxiliary tube 3 which will expand and fill the area inside of the tube 2, the thickness of the tube 2 acting as a cushion to protect the tube 3 from the nail or other object that may be projecting through the wall of the tire which has punctured the tube 2. At the same time, the other valve 36, communicaing with the cylinder 16, operates in a similar manner to the valve 26, and, when there is no air in both tubes, the valve 36 will function to keep the pressure in the auxiliary tube equal to that in the inner tube; however, the by-pass or passage 37 around the cylinder 16 opens into the valve chamber instead of below the valve, so that, when the pressure in the auxiliary tube 3 drops, all of the air in the reservoir may pass directly into the auxiliary tube 3 to maintain a constant pressure therein as long as possible. The part of the valve 5 in which the cylinder 16 is located is connected to the plug 20 with fittings similar to those connecting the cylinder 15 to the plug 19, and the inner end of the plug 20 extends through the inner tube 2 into the auxiliary tube 3. The valves 26 and 36 are shown threaded into the pistons 17 and 18, and it will be noted that, by removing the bushings 29, the tension on the springs 33 can be adjusted by turning the valves with the valves against the seats 35, and, by adjusting the tension on the springs, the air pressure required to compress them is adjusted.

The valve may also be made as shown in Figure 5, in which a common valve stem 38 is shown with two passages 39 and 40 extending therethrough, and each of these passages will be equipped with the common form of valves used in inner tube valves; the passage 39 opening through an enlarged head 41 with openings 42 therein into the inner tube 43 similar to the tube 2, and the passage 40 opening through a head 44 into an auxiliary tube 45 similar to the tube 3. The outer end of the valve 38, the body of which is enlarged to accommodate two ordinary valves, is provided with a fitting 46 having a threaded nipple 47 thereon corresponding to the end of the usual valve, and adapted to receive the usual valve cap or pump or air pressure connection so that air under pressure may be supplied to both tubes and, at the same time, through this valve, and, when the inner tube 2 is punctured, the valve in the passage 39 may be screwed downward to close this tube so that air may then be supplied only to the auxiliary tube 31 which will expand the same as hereinbefore explained for the tubes shown in Figure 1 in combination with the valve shown in Figure 2.

These inner and auxiliary tubes may also be provided with independent valves 48 and 49, as shown in Figure 4, and these valves may extend into the compartment 13, and an air hose or connection 50 may also be provided in this compartment so that the valve caps may be removed and air supplied to either tube through the connection 50. These valves and tubes are located in a compartment similar to the compartment 13, and this is provided with a cover or closure 51 similar to the closure 14.

At a point directly opposite the compartment 13, the wheel may be provided with another compartment 52 having a small hand pump 53 therein similar to pumps normally used for automobile jacks, and, with this pump, air may be forced into the reservoir 12 so that a constant pressure may be maintained therein. The compartment 52 may be provided with a cover plate 54 held by a screw 55 so that this may be moved out of the way when it is desired to supply additional air to the reservoir 12. This compartment may also be provided with a screw plug or valve 56 similar to the usual inner tube valve, and, through this valve, air may be supplied to the reservoir 12 from the compressed air hose normally found at gas stations.

The reservoir 12 may also be provided with a pressure gauge 57, as indicated in Figure 7, and this may be embedded in the outer surface or front of the wheel 4, as shown, or located at any point or points, and it will be understood that a gauge of any type may be used.

In the design shown in Figure 3, an auxiliary automatic air pump is illustrated, in which an auxiliary pump 58 is located in a compartment on the wheel, and this is actuated by a lever 59 pivotally mounted at the point 60, and the lever is controlled by a cylinder 61 and resiliently held by a spring 63.

The cylinder 61 is connected by a connection 62 to the air reservoir 12, and, when a predetermined pressure remains therein, the air pressure in the cylinder 61 will hold the lever 59 in the position shown, and prevent a weight 64 on the end thereof being thrown outward by centrifugal motion; however, when the pressure in the reservoir 12 drops below a predetermined amount, the centrifugal motion will force the weight 64 outward, and the opposite end of the lever 59 will move inward, operating the pump 58, and each time the wheel makes a revolution, this pump will operate to force air into the reservoir 12 through a connection 65 with a check valve 66 therein, the air being admitted to the pump through an open connection 67 with a check valve 68 therein. As the pump reaches an upright position on the upper side of the wheel, as shown in Figure 3, the weight 64 in combination with the spring 63 will counteract the centrifugal force so that the weight will drop downward and raise the plunger in the pump 58, and then, as it passes over the center or on the under side of the wheel, the centrifugal force in combination with the weight will draw the weight outward and force the pump plunger inward. It will be understood, however, that any automatic device may be provided for maintaining a constant pressure in the tire.

Both of the inner tubes may be of the same thickness, or the auxiliary tube inside of the inner tube may be much thicker than the inner tube, and it will also be understood that the outer surface of the inner tube may be padded, or the thickness thereof increased to form a cushion protecting the auxiliary tube from punctures and the like.

It will be understood that other changes may be made without departing from the spirit of the invention. One of which changes may be in the use of other means for automatically transferring air from the wheel reservoir to either of the tubes in the tire, another may be in the use of other means for maintaining a constant pressure in the wheel reservoir, and still another may be in the use of this combination of reservoir, tubes and automatic regulating means in combination with a plurality of tires such as used on truck wheels or with tires used for any other purpose.

The construction will be readily understood from the foregoing description. In use the device may be provided as shown and described, and it will be understood that with the parts arranged to function as described the auxiliary tube will remain inside of the inner tube, with valves communicating with both tubes, and normally both tubes will be inflated, with the auxiliary tube in about the position shown in Figure 1, and, with the automatic valve 5 operating normally, a constant pressure will be maintained in the inner tube 2 so that the tubes will remain in their respective positions; however, when the inner tube 2 is punctured so that the pressure therein will be materially reduced, the automatic valve will operate to supply sufficient air to the auxiliary tube 3 to inflate it so that it will form a lining for the inner tube 2, and, with the normal type of puncture, the auxiliary tube 3 will be protected from the object causing the puncture by the inner tube 2, and then the valve 5 will function to maintain a constant pressure in the auxiliary tube 3 and in order to maintain a constant pressure in the inner tubes, it is necessary to maintain a substantially constant pressure in the reservoir 12 so that an auxiliary pump is provided by which air may be supplied to the reservoir or, as the air hose pressure at gasoline stations is sufficiently high, this may be used to supply the air to the reservoir 12 if desired. This combination of the auxiliary inner tube inside of the regular inner tube with the reservoir makes it possible to be assured of sufficient air in your tire at all times, and guarantees against all ordinary punctures.

Having thus fully described the invention, what I claim as new, and desire to secure by Letters Patent, is:

1. A combination automobile wheel and tire comprising a wheel having a compressed air reservoir therein, a tire, an inner tube, an auxiliary inner tube inside of said inner tube, a connection between the tube and auxiliary tube and reservoir, and automatic valves in said connection adapted to maintain a constant pressure in said tubes and tire.

2. In a vehicle wheel of the disc type having a pneumatic tire on the rim, with an inner tube therein and a valve extending from said tube through a rim of the wheel, a compressed air reservoir in said wheel, and automatic means for supplying air to the inner tube from the reservoir as the pressure in the inner tube falls below a predetermined amount, characterized by an auxiliary inner tube inside of the former tube and connected to the said automatic air supplying means whereby a constant pressure will be maintained in said auxiliary tube.

3. In a vehicle wheel of the disc type having a pneumatic tire on the rim, with an inner tube therein and a valve extending from said tube through a rim of the wheel, a compressed air reservoir in said wheel, and automatic means for supplying air to the inner tube from the reservoir as the pressure in the inner tube falls below a predetermined amount, characterized by an auxiliary inner tube inside of the former tube and connected to the said automatic air supplying means whereby a constant pressure will be maintained in said auxiliary tube, and further characterized by shut-off means whereby all air will be supplied to the auxiliary inner tube when the normal inner tube is deflated by puncture or the like.

4. In a vehicle wheel of the disc type having a hub and rim, with a pneumatic tire on the said rim, an air reservoir in the said wheel, an inner tube in the said pneumatic tire, an auxiliary inner tube inside of the said former tube, an automatically operated valve for supplying air from the reservoir to both the auxiliary inner tube and also to the normal inner tube, and means in said valve for supplying air only to the auxiliary inner tube when the other inner tube is deflated.

5. A wheel, as described in claim 4, characterized in that the automatic valve comprises two cylinders, one communicating with the inner tube and the other with the auxiliary tube, with both cylinders connected to the air reservoir, and in combination therewith means closing the connection through the inner tube when the inner tube has been punctured.

6. A wheel, as described in claim 4, in which the automatic valve is incorporated in a compartment in the wheel with a closure adapted to be readily removed.

7. In combination with a wheel as described in claim 4, means through which air may be supplied to the reservoir.

GUY TOMSIC.